United States Patent [19]
Layton

[11] Patent Number: 5,240,759
[45] Date of Patent: Aug. 31, 1993

[54] AIRCRAFT FUEL MAT

[76] Inventor: Charles B. Layton, P.O. Box 8803, Columbus, Ga. 31908

[21] Appl. No.: 715,708

[22] Filed: Jun. 17, 1991

Related U.S. Application Data

[63] Continuation-in-part of Ser. No. 446,190, Dec. 4, 1989, abandoned.

[51] Int. Cl.$^5$ .................... B32B 3/10; B64D 37/00
[52] U.S. Cl. .................... 428/131; 428/134; 428/137; 428/156; 428/196; 428/207; 428/215; 244/135 A; 220/86.1; 137/377; 137/899.2
[58] Field of Search ............ 428/137, 156, 81, 215, 428/65, 172, 131, 492, 134, 196, 207, 213; 244/135 A, 904; 220/86.1; 5/417, 420; 137/294–296, 899.2, 377, 378, 381; 140/333, 338; 52/221; 273/195 R, 34 R

[56] References Cited

U.S. PATENT DOCUMENTS

| | | | |
|---|---|---|---|
| 1,768,348 | 6/1930 | Wescott | 428/131 |
| 3,622,427 | 11/1971 | Kelly | 428/65 |
| 4,031,839 | 6/1977 | Pedone | 114/183 R |
| 4,068,859 | 1/1978 | Dittman | 280/289 E |
| 4,106,772 | 8/1978 | Krawagna | 273/195 R |
| 4,323,166 | 4/1982 | Maeroff | 220/86 R |
| 4,562,111 | 12/1985 | Ogawa | 428/492 |

Primary Examiner—Donald J. Loney
Attorney, Agent, or Firm—Watson, Cole, Grindle & Watson

[57] ABSTRACT

A mat for protecting the surfaces of equipment from scratching, denting, and chemical action during servicing, particularly well suit for the surfaces of an aircraft during a refueling operation. The mat closely conforms to the surface shape of the aircraft wing and does and cannot be readily moved or damage during use. The mat preferably includes one or more depressions for containing spills fuel and/or accommodating tools and other servicing items and equipment.

15 Claims, 2 Drawing Sheets

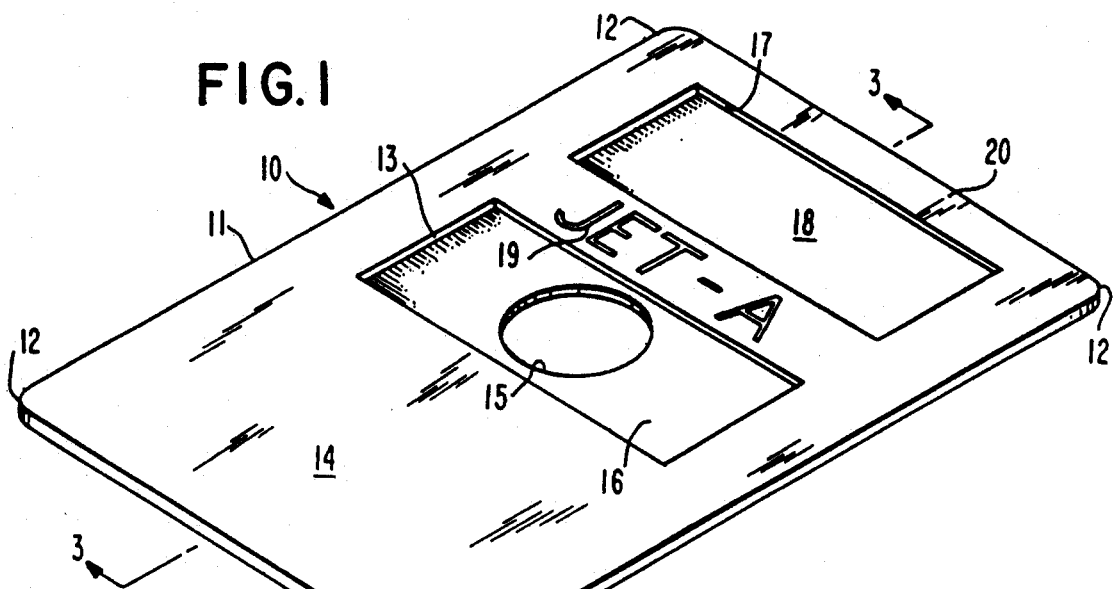
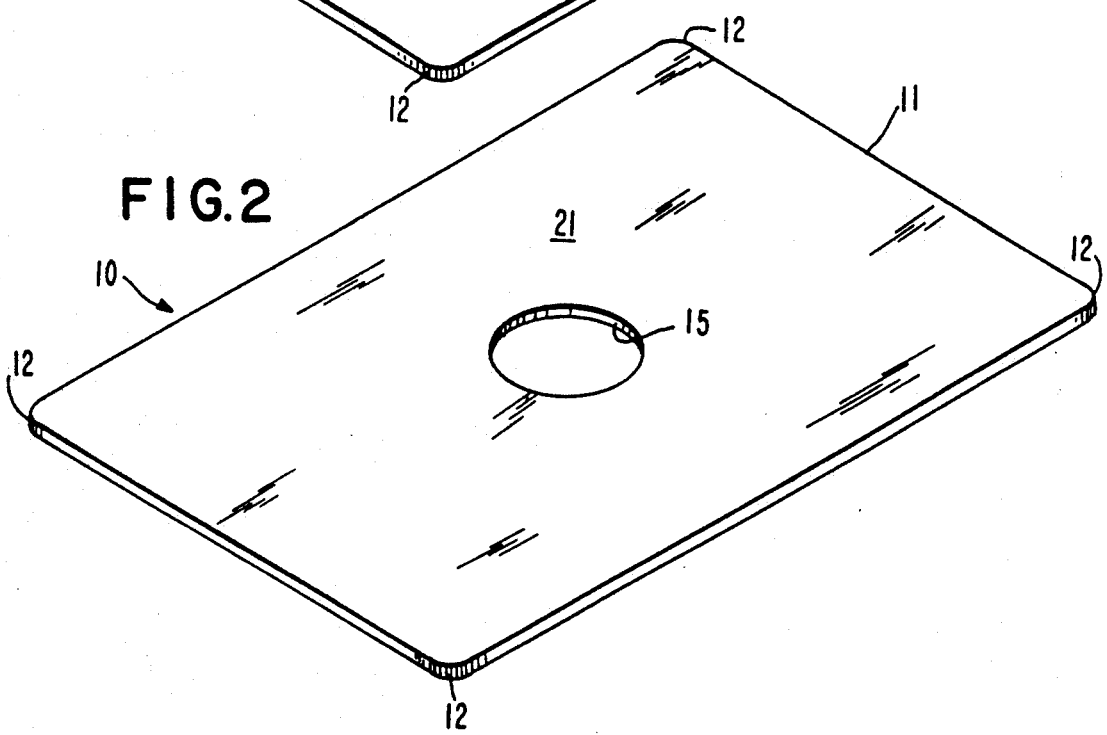
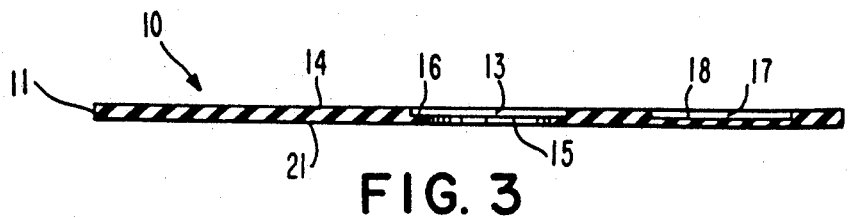

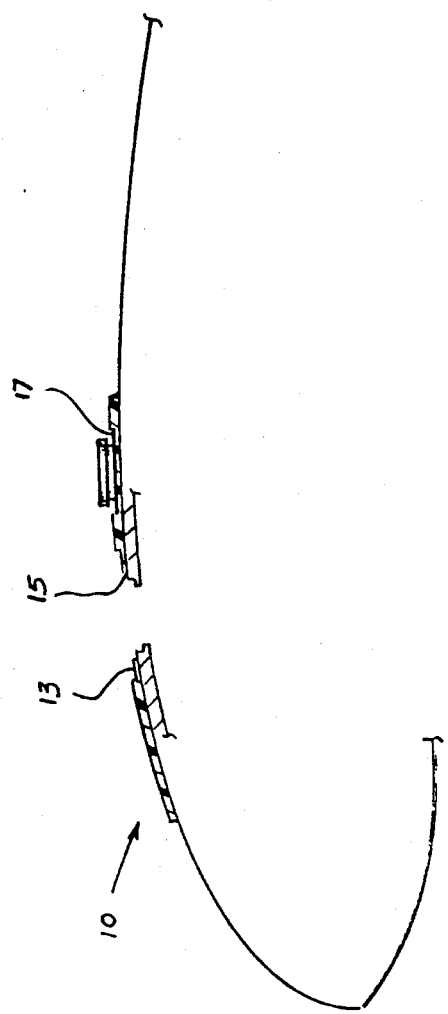

AIRCRAFT FUEL MAT

This is a continuation-in-part of copending application(s) Ser. No. 07/446,190 filed on Dec. 4, 1989 now abandoned.

BACKGROUND OF THE INVENTION

1. Field of the Invention

This invention relates generally to shields for protecting surfaces of equipment while being serviced to prevent damage by the use of tools or other servicing items or equipment that may result in scratching, denting or making the surface suspectable to chemical action or deterioration. More specifically, the invention relates to a shield for protecting the delicate surfaces and finishes of aircraft while being serviced, particularly during a refueling operation, so as to protect the surfaces from being damaged by the removed fuel cap, nozzle caps, grounding wires, additive cans, flashlight, tools and other items related to servicing the aircraft that could cause scratching, denting or defacing of the surface or finish on the aircraft surface, and to protect the aircraft surface and finish from chemical damage from fuel, and other chemicals used in servicing the aircraft or which the aircraft is exposed during use.

2. Prior Art

Aircraft generally are provided with fuel tanks located inside the wing with a fuel filler receptacle therefore being accessible from an upper side of the wing. Thus, in order to refuel the aircraft, the cap on the fuel filler receptacle is unscrewed, removed and laid aside upon the surface of the wing while a fuel nozzle is inserted into the fuel tank opening. If a wrench or other tools are also used during servicing, these are also rested on the surface of the wing while awaiting use.

With continued servicing of this nature, the surface and/or finish of the wing is subject to becoming worn and/or damaged by such objects. For example, scratches on the surface can result in stress corrosion or facilitate oxidation or adverse chemical reaction of the surface by fuel, water, acids and other chemicals that the surface comes into contact with during operation with time. Further, many times portions of the aircraft surface are painted with expensive polyurethane based enamels, which when damaged are costly to repair and deface the looks of commercial aircraft until repair can be made.

Fuel dripping from the end of the nozzle during the refueling operation can fall directly onto the surface of the wing, possibly causing deterioration of the surface finish (i.e. paint or protective chemical finishes). Also, many times during insertion of the nozzle in the fuel receptacle the service personnel initially misguides the nozzle into contact with the surface of the aircraft missing the receptacle. This action repeated through years of service causes wear and damage to the surface about the receptacle and the receptacle itself.

These practices cause premature wear and deterioration of the structure and appearance of these very costly aircraft. Further, the servicing problems are particularly detrimental with respect to aircraft due to the fragile nature of the skin construction of the aircraft. Specifically, the skin is typically a thin sheet of aluminum alloy supported and connected by rivets to stiffeners that define the significant structural components of the aircraft. The aluminum alloy skin is suspectable to being scratched, dented and worn due to contact with tools, equipment and chemicals, and is difficult and expensive to repair and replace.

Thus, different implements and methods of servicing are needed to overcome these detrimental servicing practices to sustain the life and integrity of aircraft in the aviation field.

Presently, makeshift mats are used to protect the wing surfaces of aircraft. These mats do not provide trays or receptacles for tools and related items, are subject to tearing due to their materially weak nature, and tend to roll-up or blow away in high winds. Service personnel cut holes in these mats by hand to accommodate the fuel receptacle opening leaving an imprecise sized and shaped hole subject to tearing with use. Readily available sheet materials such as those designed to cover stairway treads are adapted for use for this purpose.

SUMMARY OF THE INVENTION

Therefore, it is a principal object of the present invention to provide a mat that may be removeably placed on the equipment such as an aircraft and upon which various items may be rested while servicing the equipment.

Another object of the present invention is to provide an aircraft mat for use during servicing and refueling comprising a sheet of substantially flexible and fuel proof material having a lower side for contact and placement on the surface of the aircraft, the sheet being sufficiently flexible so that said lower side of the sheet substantially closely conforms to the shape of the aircraft surface upon which it rests during use; and an opening through the sheet of sufficient size and shape to allow the fuel cap of the aircraft to be removed and replaced therethrough.

A further object of the present invention is to provide an aircraft mat for fitting around an aircraft fuel receptacle opening so as to prevent the nozzle and/or fuel from direct contact with the aircraft surface during a refueling operation.

An even object of the present invention is to provide an aircraft mat for fitting around an aircraft fuel receptacle opening which permits the fuel cap to be taken off or put on without interference while in place.

An still further object of the present invention is to provide an aircraft mat for fitting around an aircraft fuel receptacle opening which provides a positive identification of the proper aviation fuel for the aircraft being serviced to servicing personnel.

An even still further object of the present invention is to provide a mat for fitting around an aircraft fuel receptacle opening which can protect deicer boots, prevent puncturing or chipping of painted or chemically coated and/or treated surfaces, and eliminating fuel and chemical stains and damage caused by nozzle dripping or improper servicing.

A further object of the present invention is to provide a mat for fitting around an aircraft fuel receptacle opening which is simple in design, relatively inexpensive to manufacture, rugged in construction, quick and easy to install and remove, and which furthers aviation safety.

These and other objects will readily be apparent from the following disclosure and drawings.

BRIEF DESCRIPTION OF THE DRAWINGS

FIG. 1 is a perspective view of a preferred embodiment of the present invention;

FIG. 2 is a perspective view of the bottom of the embodiment shown in FIG. 1;

FIG. 3 is a longitudinal cross-sectional view taken along the line 3—3 of FIG. 1; and FIG. 4 is a partial side cross-sectional view of the preferred embodiment of the present invention installed for use at the aircraft fuel receptacle opening of an aircraft wing.

DETAILED DESCRIPTION OF PREFERRED EMBODIMENTS

A preferred embodiment of the mat 10 according to the present invention is shown in FIG. 1. The mat 10 comprises a rectangular shaped sheet 11 made of resilient solid rubber based material such as SBR-nitrile, synthetic resin(s) or other suitable materials in the form of a uniform composition or composite with other reinforcing materials (e.g. fiberglass, Kevlar, or other fiber materials) that are fuelproof alone or when combined with other materials in the final product and provide sufficient mechanical properties to prevent tearing, surface gouging, etc. to withstand hard service use.

The corners of the sheet 11 are rounded off to prevent the clothes of service personnel, tools, etc. catching on a corner of the mat 10 during use and causing displacement of the mat from the location at which it was previously positioned (i.e. installed position about fuel receptacle opening). The size of the mat is selected so as to provide a sufficient shield to prevent damage in and around the area of the aircraft to be serviced. Further, the mat can have a variety of shapes and sizes that differ from the preferred embodiment shown in the figures, for example, oval or triangular.

The thickness of the flat sheet 11, weight and composition of the sheet material are selected so that the mat 10 readily conforms throughout its dimensions to a variety of different surface contours of the aircraft (e.g. wing surface contour) during use. Further, the mat 10 of this construction tends to somewhat adhere to the surface of the aircraft due to its resilience, weight and surface properties of the sheet material so as to tend to stay in position during use. In the embodiment shown in the figures, the sheet 11 is substantially uniform in thickness, for example, three sixteenths (3/16) inch thickness in order to be sufficiently flexible to conform to curved surface contours of the aircraft. The uniform thickness of the sheet 11 throughout its dimensions also rendered the sheet 11 sufficiently flexible to closely conform to the surface curvatures of the aircraft surface.

Preferably, the mat is provided with one or more depressions therein defining one or more trays. For example, a rectangular depression 13 can be provided (e.g. by molding) in the upper side of the sheet 11 providing a surrounding portion 14. An opening 15 is provided through a bottom wall 16 of the depression 13 to gain access to the fuel cap after placement of the mat 10 on the aircraft surface. In the embodiment shown in FIG. 1, the opening 15 is centrally located in the sheet 11 with the depression 13 fully surrounding the opening 15. In other embodiments, the opening 15 can be positioned at different locations on the sheet, for example, close to one edge of the sheet 11.

The size and shape of the opening 15 are selected so that the mat 10 can be positioned in place on the surface of the aircraft wing and allow subsequent removal and replacement of the fuel cap through the opening 15. The fuel cap can be laid in a depression in the mat 10 when removed.

Preferably, the mat 10 is provided with another depression 17 in the upper side of the sheet 11. The depression 17 is partially defined by a bottom wall 18 so as to serve as a tray, for example, for the removed fuel cap, nozzle caps, grounding wires, additive cans, flashlight, tools and other items relating to servicing the aircraft. In alternative embodiments, only the depression 18 is provided with an opening similar to opening 15, or both depressions 13,17 are each provided with an opening 15.

The mat 10 can be made from sheet material and/or molded. The bottom walls 16,18 can be molded, cut, machined, etc. into the upper side of the sheet 11. Preferably, the bottom walls 16,18 are three-thirty seconds (3/32) inch in depth. Further, in the embodiment shown, the depressions are separate and discrete from each other on the upper side of the mat 10.

The mat 10 is preferably provided with means for indicating to line service personnel the type of aircraft fuel (e.g. jet fuel) to be utilized with a particular type of aircraft. For example, a mark 19 can be provided on an upper side of the sheet 11 by printing, molding, etc. The mark can be the same or a different color from the mat 10 itself and identify the fuel type, for example, by name and/or number. Alternatively, or in addition, the mat 10 can be color coded to indicate the type of fuel and/or the type of aircraft the mat should be used with during refueling.

A space 20 can be provided along one edge of the mat 10 to allow an operator to print, for example by stenciling, the aircraft registration number and/or company name thereon.

In use, the mat 10 is simply laid down upon the surface of the aircraft and the fuel cap is subsequently removed through the opening 15 so that the mat serves as a protective shield or collar around the fuel receptacle opening. The fuel cap, tools, etc. are then placed into the tray and the fuel nozzle is inserted into the fuel filler receptacle for refueling the aircraft. Afterwards, the fuel cap is replaced and the mat 10 is lifted off the surface of the aircraft.

During the refilling operation, an fuel inadvertently spilled from the end of the fuel nozzle can be received within and contained in the depression 13 located around the opening 15. The volume of the depression is sufficient so that the spilled fuel will be substantially contained as it drains through the opening 15 into the fuel receptacle opening of the aircraft. Further, the bottom side of the mat 10 around the opening 10 adequately seals with the surface of the aircraft located around the fuel receptacle opening to prevent the spilled fuel from flowing under the mat and significantly wetting the aircraft surface.

The mat can also be used on any surface of the aircraft (i.e. apart from the fuel receptacle opening) to serve as a tray(s) for tools and other servicing items and equipment.

The mat according to the present invention can be utilized in other similar applications, outside the field of aviation, however, the invention is particularly well suited for this particular application due to the existing practices and type of environment (i.e. delicate nature of aircraft skin and finish in combination with requirement for long wear, durability, and structural soundness to preserve safety).

While various changes or modifications may be made in the preferred embodiment shown and discussed in detail, it is understood that such changes or modifications will be within the spirit and scope of the present invention as is defined by the appended claims.

I claim:

1. A refueling mat for protecting the surface of an aircraft wing from fuel spilled during refueling, said mat for placement around an opening in said surface having a fuel filler receptacle and a fuel filler cap therein for accessing a tank inside said wing to permit refueling thereof, comprising: a flat flexible sheet of resilient material having upper and bottom sides and a central opening therein, the bottom side of said sheet comprising a smooth surface for conformally engaging and adhering to the wing without slippage and sealing the surface about said fuel filler receptacle, the central opening being sized for receiving the fuel cap therethrough for installation in said fuel filler receptacle, the upper side of said sheet having a first relatively shallow depression formed with a continuous side wall spaced away from and surrounding said central opening on all sides thereof defining a relatively large area for confirming spilled fuel therein and allowing the spilled fuel to drain into said fuel filer receptacle via the central opening without substantial seepage onto the wing under the bottom side of the mat, and wherein said upper side has a second depression formed adjacent the first depression, said second depression serving as a tray for holding said fuel cap when removed from said fuel filler receptacle.

2. A fuel mat for use on a refueling surface of an aircraft during refueling, said surface having a fuel inlet therein supplied by a fuel nozzle, comprising:
a sheet of substantially flexible and aviation fuel proof material for shielding the aircraft from spilled fuel during refueling, said sheet for placement upon the refueling surface, and having a smooth lower surface for conformal, non-slip and fuel sealing contact with the refueling surface during use;
said sheet having a through opening sized and shaped for accommodating the fuel nozzle therethrough;
said sheet having an upper surface formed with a relatively shallow recess therein defining an upstanding side wall surrounding said opening for accommodating and containing a quantity of fuel spilled during refueling, and wherein said lower side of said sheet engages the aircraft refueling surface around said opening for containing said quantity of spilled fuel within said recess without substantial seepage under said sheet via said opening, and wherein the upper surface of said sheet has a second relatively shallow recess for holding articles related to refueling the aircraft.

3. The aircraft fuel mat according to claim 2, wherein said second recess is separate and discrete from said recess formed around said opening in said sheet.

4. The aircraft fuel mat according to claim 2, wherein said sheet includes a portion surrounding said recess having a substantially uniform thickness.

5. The aircraft fuel mat according to claim 4, wherein said portion surrounding said recess is approximately three sixteenths (3/16) inch in thickness.

6. The aircraft fuel mat according to claim 2, wherein said sheet has a substantially uniform in thickness in said recess.

7. The aircraft fuel mat according to claim 6, wherein said recess is about three-thirty seconds (3/32) inch in thickness.

8. The aircraft fuel mat according to claim 2, wherein said sheet includes indica for indicating the type of aircraft fuel to be used during refueling.

9. The aircraft fuel mat according to claim 8, wherein said indica is a mark provided on the upper side of said mat.

10. The aircraft fuel mat according to claim 9, wherein said mark is molded into the upper side of said mat.

11. The aircraft fuel mat according to claim 2, wherein said mat is color coded to indicate a particular aircraft fuel.

12. The aircraft fuel mat according to claim 2, wherein said mat is color coded to indicate a particular type of aircraft.

13. The aircraft fuel mat according to claim 2, wherein said sheet has a weight sufficient to allow the sheet to closely conform with and sealingly engage the refueling surface during use.

14. The aircraft fuel mat according to claim 2, therein said opening is sized and shaped to allow for the removal and replacement of an aircraft fuel cap through the said opening after placement of the mat on the aircraft for the refueling operation.

15. An equipment servicing mat for shielding an equipment surface adjacent a refueling opening during a refueling operation comprising:
a sheet of substantially flexible and fuel proof material for placement upon the equipment, said sheet having a lower side for conformal sealing engagement with the equipment surface during use; said sheet having an opening therethrough sized and shaped for accommodating said refueling nozzle and being formed with a recess defining continuous upstanding side walls surrounding said opening for confining spilled fuel therewithin and allowing said confined fuel to flow into said refueling opening without substantial seepage under the sheet, and wherein the recess extends laterally and longitudinally of the mat for allowing spilled fuel to spread in said recess for confinement therein.

* * * * *